(12) United States Patent
Du et al.

(10) Patent No.: US 12,387,349 B2
(45) Date of Patent: Aug. 12, 2025

(54) CAMERA TO VEHICLE ALIGNMENT WITH MULTIPLE CAMERA ADJUSTMENT

(71) Applicant: GM Global Technology Operations LLC, Detroit, MI (US)

(72) Inventors: Xinyu Du, Oakland Township, MI (US); Binbin Li, Columbus, OH (US); Yao Hu, Sterling Heights, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 60 days.

(21) Appl. No.: 18/169,081

(22) Filed: Feb. 14, 2023

(65) Prior Publication Data
US 2024/0273741 A1    Aug. 15, 2024

(51) Int. Cl.
*H04N 7/18* (2006.01)
*G06T 3/12* (2024.01)
*G06T 3/60* (2006.01)
*G06T 7/33* (2017.01)

(52) U.S. Cl.
CPC ............... *G06T 7/337* (2017.01); *G06T 3/12* (2024.01); *G06T 3/60* (2013.01); *G06T 2207/30244* (2013.01); *G06T 2207/30252* (2013.01)

(58) Field of Classification Search
CPC .. G06T 7/337; G06T 3/12; G06T 3/60; G06T 2207/30244; G06T 2207/30252; H04N 7/18
USPC ......................................................... 348/148
See application file for complete search history.

(56) References Cited

U.S. PATENT DOCUMENTS

| | | | | |
|---|---|---|---|---|
| 8,248,471 | B2* | 8/2012 | Inui ........................... | G06T 7/80 701/1 |
| 9,981,605 | B2* | 5/2018 | Wang ................... | H04N 13/243 |
| 2009/0169052 | A1* | 7/2009 | Seki ......................... | G06T 7/74 348/148 |
| 2014/0347470 | A1* | 11/2014 | Zhang .................... | B60R 11/04 382/104 |
| 2015/0332098 | A1* | 11/2015 | Wang ........................ | G06T 7/73 382/103 |
| 2015/0332446 | A1* | 11/2015 | Wang ...................... | B60R 11/04 348/37 |

(Continued)

*Primary Examiner* — Trang U Tran
(74) *Attorney, Agent, or Firm* — CANTOR COLBURN LLP (57) ABSTRACT

A vehicle includes a system that performs a method for aligning a first camera and a second camera to a reference frame of the vehicle. The first camera has a first coordinate system, and the second camera has a second coordinate system. The first camera obtains a first image. The processor is configured to obtain a first camera-to-ground transformation matrix for the first camera using the first image, wherein the first camera-to-ground transformation matrix relates the first coordinate system to a ground coordinate system, obtain a camera-to-camera transformation matrix between the first coordinate system of the first camera and the second coordinate system of the second camera, calculate a constructed camera-to-ground transformation matrix for the second camera using the first camera-to-ground transformation matrix and the camera-to-camera transformation matrix, and update the second coordinate system of the second camera using the constructed camera-to-ground transformation.

20 Claims, 9 Drawing Sheets

(56) References Cited

U.S. PATENT DOCUMENTS

2018/0365509 A1* 12/2018 Naserian ................ G06V 20/56
2019/0011927 A1*  1/2019 Mou ...................... G06V 20/56
2021/0192788 A1*  6/2021 Diederichs ............ G01S 17/931

* cited by examiner

CAMERA TO VEHICLE ALIGNMENT WITH MULTIPLE CAMERA ADJUSTMENT

INTRODUCTION

The subject disclosure relates to camera alignment of cameras in vehicles and, in particular, to a system and method for aligning reference frames of multiple cameras to a reference frame of a vehicle using images from the multiple cameras.

Camera-to-vehicle alignment is useful for perception and motion planning in vehicles. A camera-to-ground alignment process is used to align a camera reference frame to a ground reference frame. The results of the camera to ground alignment process can be used to align the camera to a vehicle reference frame. However, environment noise, driving maneuvers, or differences in road bank angle can affect the results of camera-to-ground alignment. Accordingly, it is desirable to provide a method of camera to vehicle alignment that overcomes these environmental effects.

SUMMARY

In one exemplary embodiment, a method of aligning a first camera of a vehicle and a second camera of the vehicle to a reference frame of the vehicle is disclosed. A first camera-to-ground transformation matrix is obtained for the first camera using a first image obtained using the first camera, wherein the first camera-to-ground transformation matrix relates a first coordinate system of the first camera to a ground coordinate system. A camera-to-camera transformation matrix is obtained between the first coordinate system of the first camera and a second coordinate system for the second camera. A constructed camera-to-ground transformation matrix is calculated for the second camera using the first camera-to-ground transformation matrix and the camera-to-camera transformation matrix. The second coordinate system is updated using the constructed camera-to-ground transformation matrix for the second camera.

In addition to one or more of the features described herein, updating the second coordinate system further includes extracting a roll angle from the constructed camera-to-ground transformation matrix, obtaining a motion vector and a normal vector from a second image obtained using the second camera, and rotating the motion vector and the normal vector using the roll angle to generate a rotated motion vector. The method further includes generating a pitch angle and a yaw angle using the rotated motion vector and a rotated normal vector. The method further includes determining a first bird's eye view image for the first image and a second bird's eye view image for a second image from the second camera and aligning the first bird's eye view image to the second bird's eye view image. Aligning the first bird's eye view image to the second bird's eye image view further includes running an optimization program on overlapping regions of the first bird's eye view image and the second bird's eye view image. The method further includes running the optimization program to determine a transformation matrix between the first bird's eye view image and the second bird's eye view image that minimizes a difference between a first intensity of a first pixel in the first bird's eye view image and a second intensity of a second pixel in the second bird's eye view image. The method further includes maturating the first camera-to-ground transformation matrix to generate a camera-to-vehicle transformation matrix for the first camera.

In another exemplary embodiment, a system for aligning a first camera of a vehicle and a second camera of the vehicle to a reference frame of the vehicle is disclosed. The system includes a processor configured to obtain a first camera-to-ground transformation matrix for the first camera using a first image obtained using the first camera, wherein the first camera-to-ground transformation matrix relates a first coordinate system of the first camera to a ground coordinate system, obtain a camera-to-camera transformation matrix between the first coordinate system of the first camera and a second coordinate system of the second camera, calculate a constructed camera-to-ground transformation matrix for the second camera using the first camera-to-ground transformation matrix and the camera-to-camera transformation matrix, and update the second coordinate system of the second camera using the constructed camera-to-ground transformation matrix for the second camera.

In addition to one or more of the features described herein, the processor is further configured to extract a roll angle from the constructed camera-to-ground transformation matrix, obtain a motion vector and a normal vector from a second image obtained using the second camera, and rotate the motion vector and the normal vector using the roll angle to generate a rotated motion vector. The processor is further configured to generate a pitch angle and a yaw angle using the rotated motion vector and a rotated normal vector. The processor is further configured to determine a first bird's eye view image for the first image and a second bird's eye view image for a second image from the second camera and align the first bird's eye view image to the second bird's eye view image. The processor is further configured to run an optimization program on overlapping regions of the first bird's eye view image and the second bird's eye view image to align the first bird's eye view image to the second bird's eye view image. The processor is further configured to run the optimization program to determine a transformation matrix between the first bird's eye view image and the second bird's eye view image that minimizes a difference between a first intensity of a first pixel in the first bird's eye view image and a second intensity of a second pixel in the second bird's eye view image. The processor is further configured to maturate the first camera-to-ground transformation matrix to generate a camera-to-vehicle transformation matrix for the first camera.

In yet another exemplary embodiment, a vehicle is disclosed. The vehicle includes a first camera for obtaining a first image, the first camera having a first coordinate system, a second camera having a second coordinate system, and a processor. The processor is configured to obtain a first camera-to-ground transformation matrix for the first camera using the first image, wherein the first camera-to-ground transformation matrix relates the first coordinate system to a ground coordinate system, obtain a camera-to-camera transformation matrix between the first coordinate system of the first camera and the second coordinate system of the second camera, calculate a constructed camera-to-ground transformation matrix for the second camera using the first camera-to-ground transformation matrix and the camera-to-camera transformation matrix, and update the second coordinate system of the second camera using the constructed camera-to-ground transformation matrix.

In addition to one or more of the features described herein, the processor is further configured to extract a roll angle from the constructed camera-to-ground transformation matrix, obtain a motion vector and a normal vector from a second image obtained using the second camera, and rotate the motion vector and the normal vector using the roll angle to generate a rotated motion vector. The processor is further configured to generate a pitch angle and a yaw angle using the rotated motion vector and a rotated normal vector. The processor is further configured to determine a first bird's eye view image for the first image and a second bird's eye view image for a second image from the second camera and align the first bird's eye view image to the second bird's eye view image. The processor is further configured to run an optimization program on overlapping regions of the first bird's eye view image and the second bird's eye view image to align the first bird's eye view image to the second bird's eye view image. The processor is further configured to run the optimization program to determine a transformation matrix between the first bird's eye view image and the second bird's eye view image that minimizes a difference between a first intensity of a first pixel in the first bird's eye view image and a second intensity of a second pixel in the second bird's eye view image.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
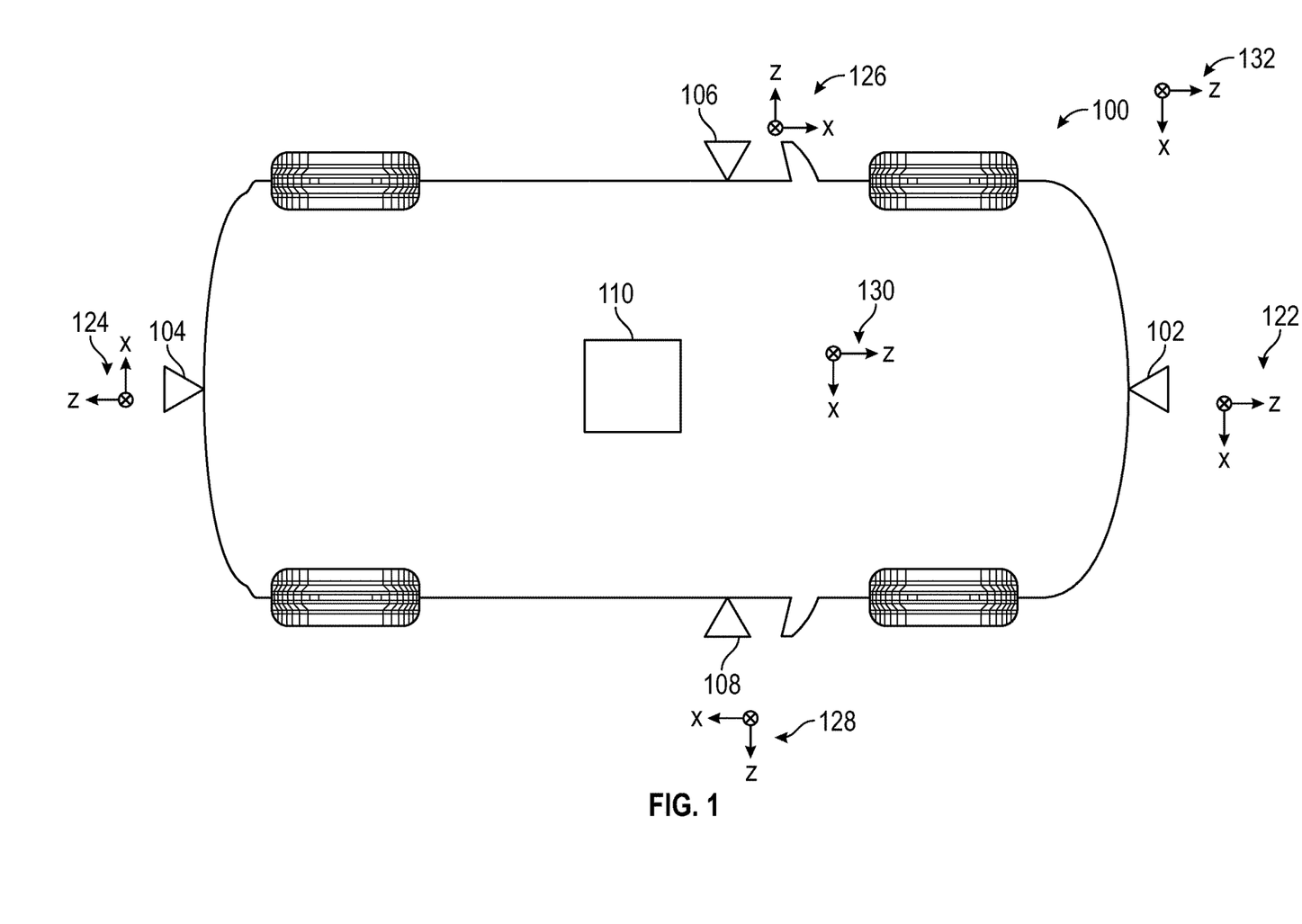
FIG. 1 shows a vehicle schematically in plan view in an exemplary embodiment.

In accordance with an exemplary embodiment, FIG. 1 shows vehicle 100 schematically in plan view. The vehicle 100 can be an autonomous vehicle or a vehicle operating in a suitable cruise control mode. The vehicle 100 includes a front camera 102, a rear camera 104, a left side camera 106 and right-side camera 108. The selection of four cameras is for illustrative purposes only. It is understood that any number of cameras can be arranged on the vehicle 100.

Each camera has an associated coordinate system that defines a reference frame for the camera. Front coordinate system 122 is associated with front camera 102. Rear coordinate system 124 is associated with rear camera 104. Left coordinate system 126 is associated with left side camera 106. Right coordinate system 128 is associated with right-side camera 108. The vehicle 100 can also have an associated vehicle-centered coordinate system 130. Similarly, a ground-centered coordinate system 132 defines a reference frame of the ground or terrain outside of the vehicle 100.

For each camera's coordinate system, the z-axis generally extends away from the camera along the principal axis of the camera and the y-axis points toward the ground. The coordinate systems are right-handed. Thus, for the front camera 102, the x-axis extends to the right of the vehicle, for the rear camera 104, the x-axis extends to the left of the vehicle, for the left side camera 106, the x-axis extends to the front of the vehicle, and for the right-side camera 108, the x-axis extends to the rear of the vehicle. The coordinate systems shown in FIG. 1 are for illustrative purposes only. In various embodiments, the axes of the coordinate systems can be selected based on the needs or desires of the manufacturer.

Each camera is in communication with a controller 110 of the vehicle. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 110 may include a non-transitory computer-readable medium that stores instructions which, when processed by one or more processors of the controller 110, implement a method of aligning the coordinate systems of the cameras with each other according to one or more embodiments detailed herein.

Each camera can capture one or more images and send the one or more images to the controller 110 for processing. The controller 110 determines a transformation matrix between reference frames and can be used to align the coordinate system of one or more cameras to the vehicle's reference frame. The transformation matrix can be between a coordinate system of a first camera and a coordinate system of a second camera, between a coordinate system of a camera and the vehicle-centered coordinate system or between a coordinate system of a camera and the ground-centered coordinate system. The controller 110 can then use information based on an object present in images from multiple cameras and as understood through the aligned coordinate systems to perform various operations.

Figure 2:
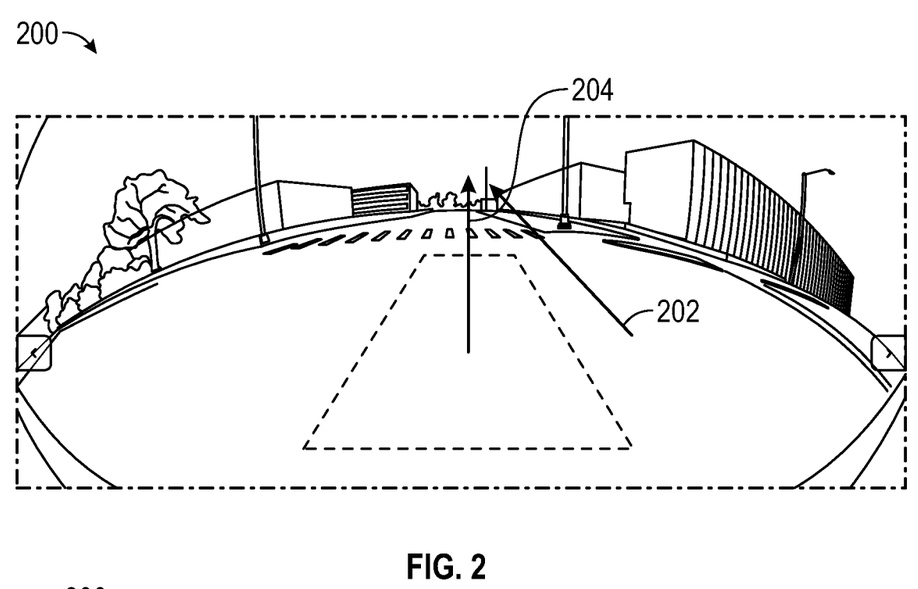
FIG. 2 shows an image obtained from a camera of the vehicle, in an illustrative embodiment.

FIG. 2 shows an image 200 obtained from a camera of the vehicle 100, in an illustrative embodiment. For illustrative purposes, the image 200 is from the front camera 102 and includes a view of an area in front of the vehicle 100. By obtaining multiple images during motion of the vehicle 100, the controller 110 determines a motion vector 202 that indicates a direction of motion of the vehicle. The controller 110 also determines a ground normal vector 204 extending perpendicular to the ground using the multiple images. From the ground normal vector 204 and the motion vector 202, a transformation matrix can be determined between the camera-based coordinate system for the front camera 102 (front coordinate system 122) and the ground-centered coordinate system 132. The camera-to-ground transformation matrix may be referred to herein as $T_{C2G}$.

Figure 3:
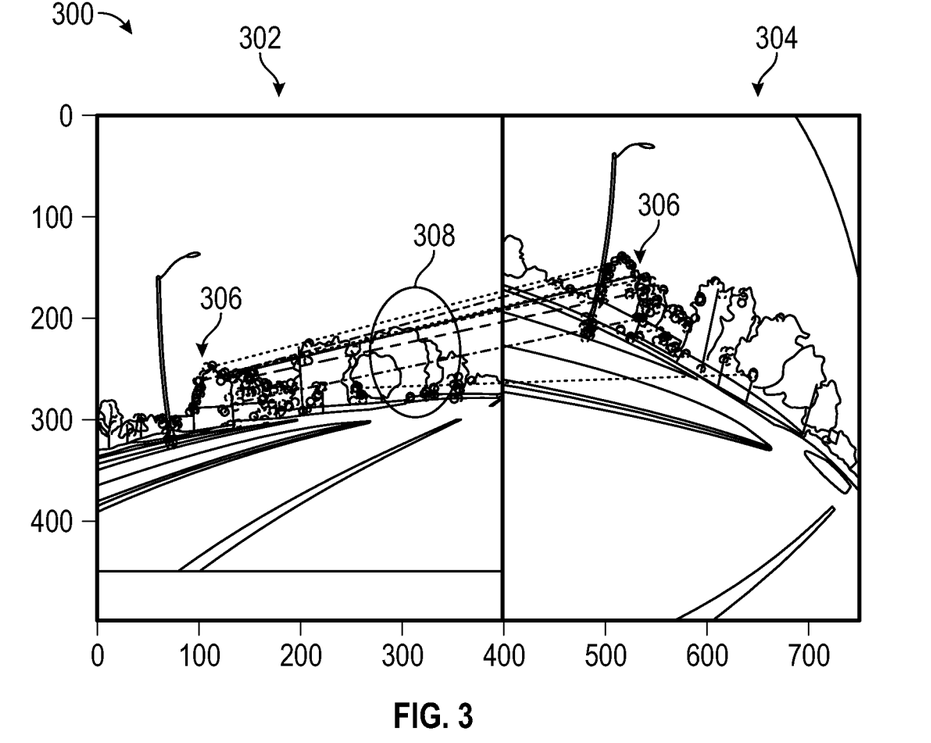
FIG. 3 shows a pair of images illustrating a method of extracting a camera-to-camera transformation matrix.

FIG. 3 shows a pair of images 300 illustrating a method of extracting a camera-to-camera transformation matrix. The pair of images 300 includes first image 302 obtained from a first camera and a second image 304 obtained from a second camera. For illustrative purposes. The first image 302 is a front view image obtained using the front camera 102 and the second image 304 is a left side image obtained using the left side camera 106. Because the fields of view of the cameras overlap, an object 306 can be located within each of the first image 302 and the second image 304. The controller 110 can locate and identify features of the object 306 in each of the first image 302 and the second image 304 and generate feature pairs between a feature in one image and the same feature in another image. Several feature pairs are shown and represented by connecting lines 308. Once the feature pairs have been generated, the controller 110 can use the feature pairs to extract a camera-to-camera transformation matrix between the first camera (e.g., the front camera 102) and the second camera (e.g., the left side camera). The camera-to-camera transformation matrix may be referred to herein at $T_{C2C}$.

Figure 4:
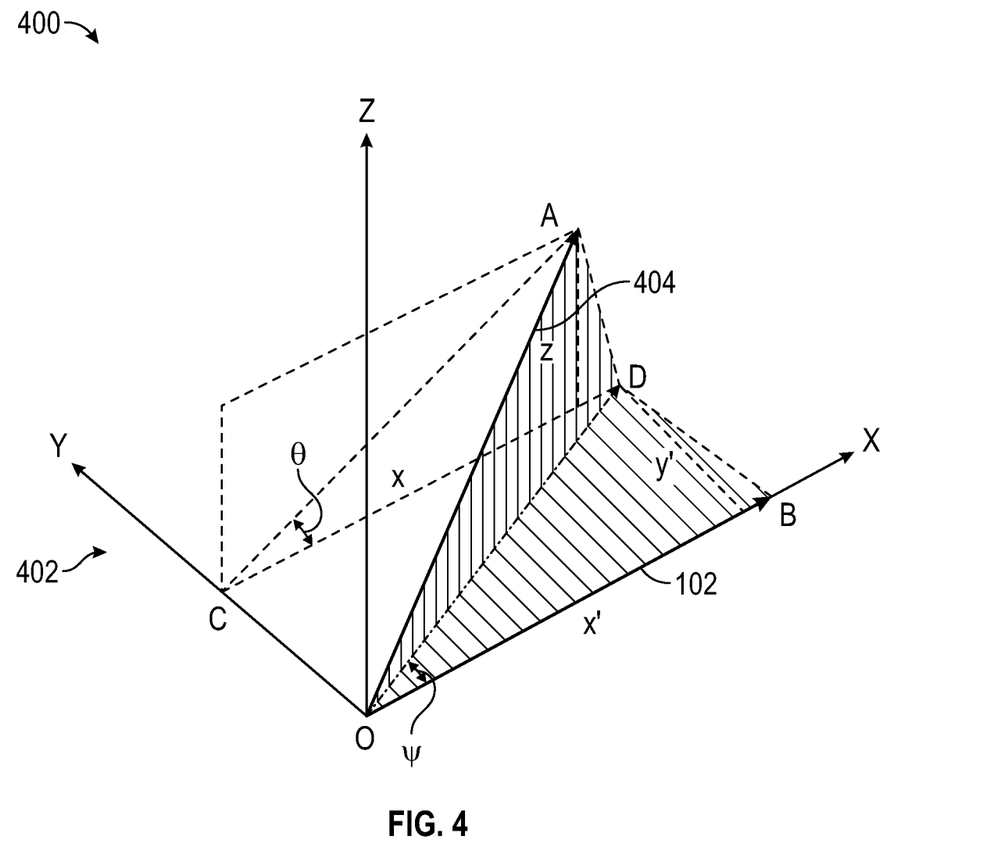
FIG. 4 is a diagram illustrating a rotated motion vector within a coordinate system.

FIG. 4 is a diagram 400 illustrating a rotated motion vector 404 within a coordinate system 402. The coordinate system 402 includes the x-axis, y-axis and z-axis. A rotated motion vector 404 is shown within the coordinate system 402. The rotated motion vector 404 is a result of rotation of an original motion vector by a rotation through a roll angle (i.e., about the x-axis). The rotation can be through a roll angle that aligns a ground normal vector within the first image with the ground normal vector within the second image. The original motion vector is located within an image from a camera that is associated with the coordinate system 402. Once the original motion vector has been rotated to generate the rotated motion vector 404, a pitch angle and yaw angle can be determined using the rotated motion vector. Referring to FIG. 4, coordinates (x, z) are coordinates of the rotated motion vector 404 along the X-axis and Z-axis, respectively, of the coordinate system 402. A pitch angle θ can be determined from these coordinates, as shown in Eq. (1):

$$\theta = \arctan(z/x) \qquad \text{Eq. (1)}$$

It is noted that when the coordinate system 402 is that of a side camera of the vehicle, the rotated motion vector 404 lies close to the X-axis after the roll rotation. Thus, the related x-coordinate is large enough so that the pitch angle calculated using Eq. (1) does not suffer from inaccuracies due to small values of x. however, when the coordinate system 402 is that of a front (or rear) camera, the motion vector lies close to the Y-axis. As a result, the value for the x-coordinate can be small, which can introduce inaccuracies into the calculation of pitch.

Line OD is a projection of the rotated motion vector 404 into the XY plane. Coordinates (x', y') are coordinate of the line OD along the X-axis and Y-axis, respectively, of the coordinate system 402. A yaw angle ψ can be determined from these coordinates, as shown in Eq. (2):

$$\psi = -\arctan(y'/x') = -\arcsin(y') \qquad \text{Eq. (2)}$$

The roll angle, pitch angle and yaw angle are thus able to be used to generate a transformation matrix for the coordinate system based on the motion vector.

The roll angle is generally constructed using a first image from a first camera while the coordinate system shown in FIG. 4 is that of a second camera. The rotation of the motion vector aligns the motion vector as seen in the first image with the motion vector as second in a second image from the second camera.

Figure 5:
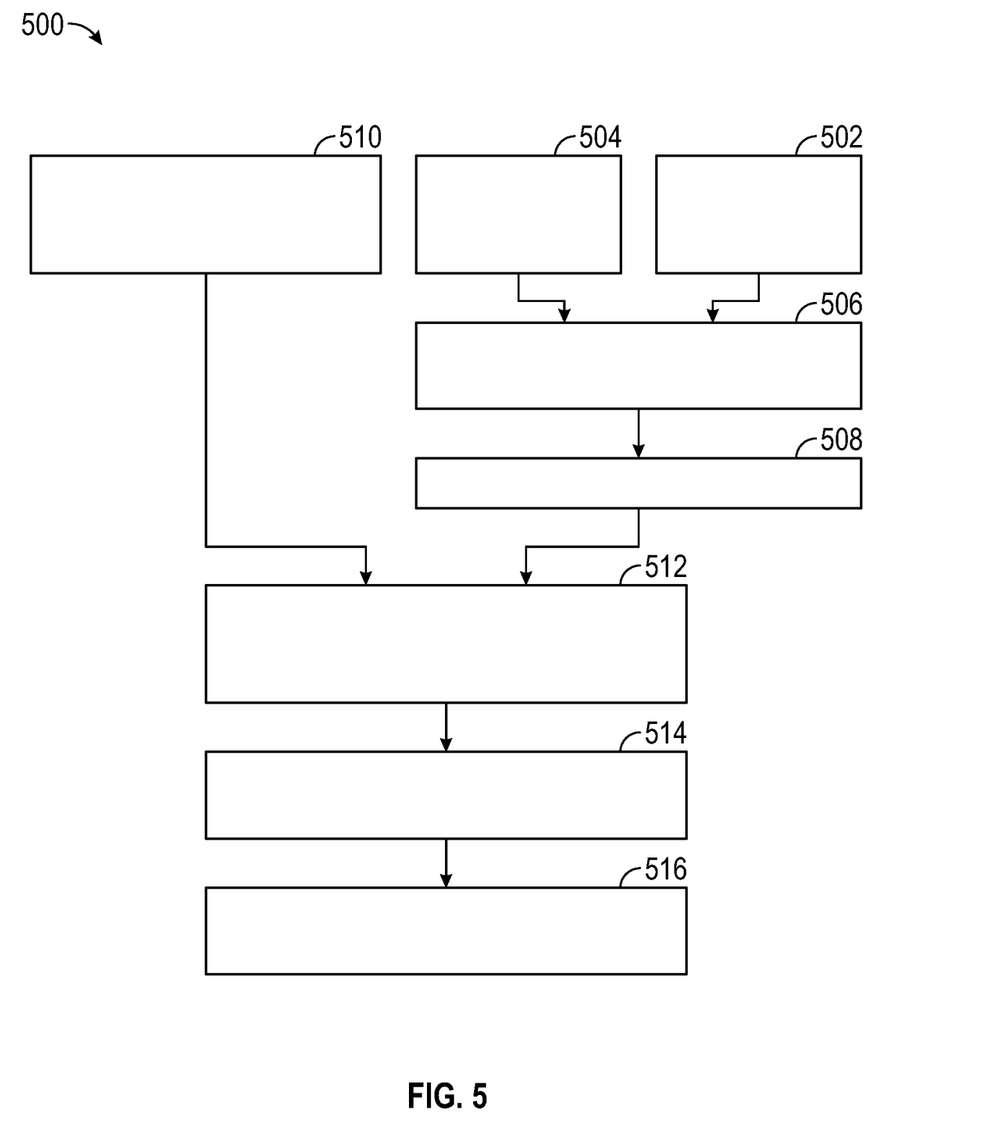
FIG. 5 shows a flowchart of a method for aligning cameras of a vehicle using the method discussed in FIGS. 2-4.

FIG. 5 shows a flowchart 500 of a method for aligning cameras of a vehicle using the method discussed in FIGS. 2-4. In box 502, a camera-to-ground transformation matrix $[T_{C2G}]_1$ is determined for a first camera (e.g., a front camera) using a first image obtained from the first camera. In box 504, a camera-to-camera transformation matrix $[T_{C2C}]$ is extracted between the first camera and a second camera (e.g., left side camera). In box 506, the camera-to-ground transformation matrix for the first camera and the camera-to-camera transformation matrix between the first camera and the second camera are used to generate a constructed camera-to-ground transformation matrix for the second camera $[T_{C2G}]_2$.

In box 508, the roll angle is extracted from the constructed camera-to-ground transformation matrix for the second camera generated in box 506.

In box 510, a motion vector is extracted from within a second image obtained at the second camera. In box 512, the motion vector is rotated through the roll angle to generate the rotated motion vector 404. In box 514, pitch and yaw angles are determined based on the rotated motion vector 404. In box 516, a modified rotation transformation matrix is formed using the roll, pitch and yaw angles. The modified rotation transformation matrix can be used to adjust the second camera, thereby aligning the coordinate system of the second camera to the coordinate system of the first camera.

Figure 6:
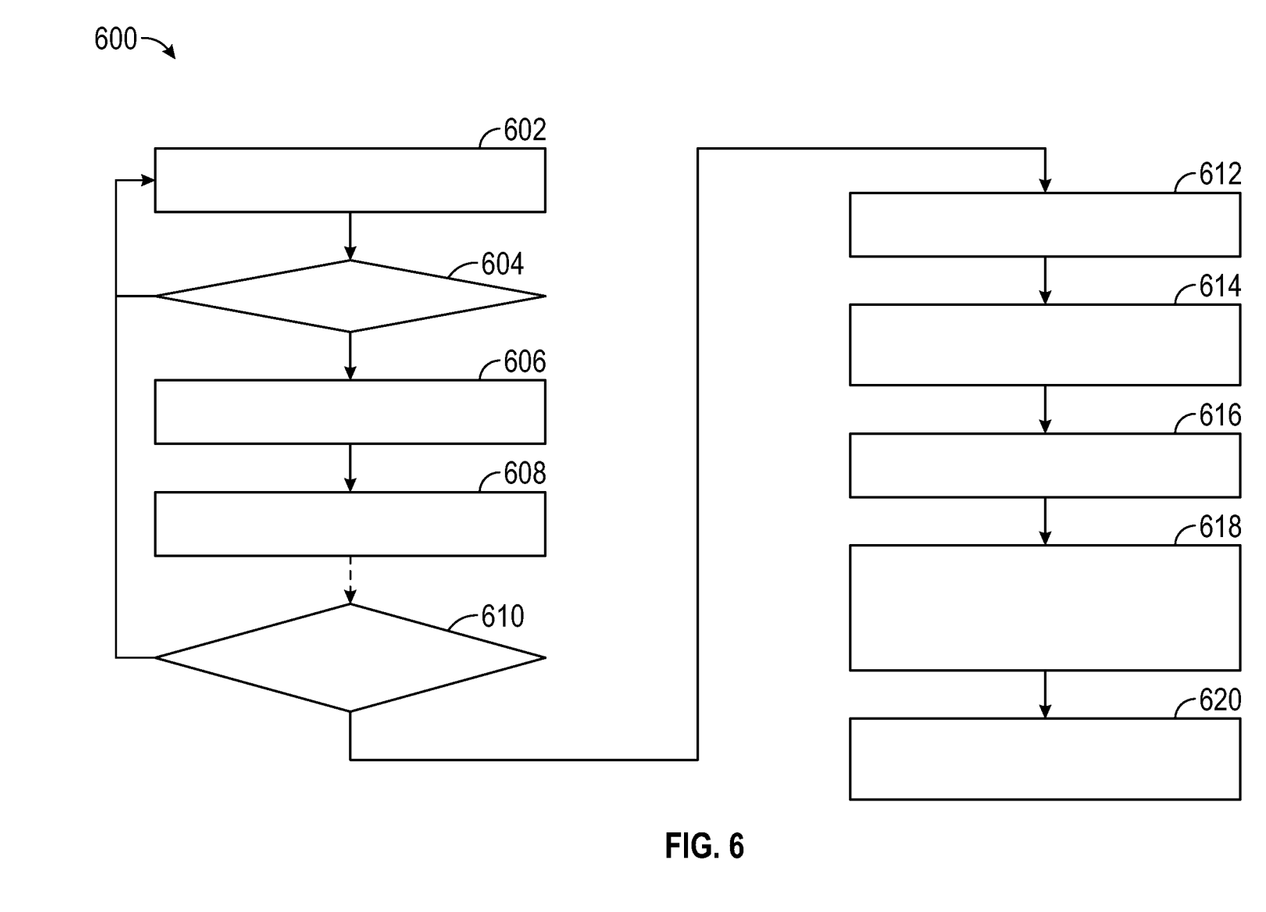
FIG. 6 shows a flowchart of a method for aligning cameras of the vehicle using multi-camera optimization.

FIG. 6 shows a flowchart 600 of a method for aligning cameras of the vehicle using multi-camera optimization (MCO). In box 602, an image is received from N cameras, where N is an integer greater than one. In box 604, a check is made as to whether the images from the N cameras are synchronized to each other such that images that are meant to be obtained at the same time are indeed obtained at the same time. If the images are not synchronized, the method can return to box 602. Otherwise, the method proceeds to box 606. In box 606, the images are cropped or downsized in a pre-processing step. In box 608, the images are stored in a running buffer. The images can be saved until a selected time period has elapsed or until a selected number of the images have been obtained.

In box 610, after the time period has elapsed, a check is made as to whether enough images have been accumulated during this time period. If the number of images is less than a threshold value, the method returns to box 602 for collection of more images. Otherwise, the method proceeds to box 612. In box 612, the buffered images are loaded into a program. In box 614, the camera-to-ground transformation for each of the cameras are loaded into the program. In box 616, the camera-to-ground transformations are applied to their respective images to obtain bird's eye view images for each of the images from the cameras.

In box 618, an optimization algorithm is performed on the bird's eye view images in order to align the bird's eye view images to each other. The optimization algorithm adjusts the spatial relation between the bird's eye views, to determine a camera-to-camera transformation matrix between them. In an embodiment, the optimization algorithm determines a transformation matrix between a first bird's eye view image and a second bird's eye view image using regions of overlap between the first bird's eye view image and the second bird's eye view image. In box 620, the transformation vector obtained using the optimization process is used to update alignment results.

Figure 7:
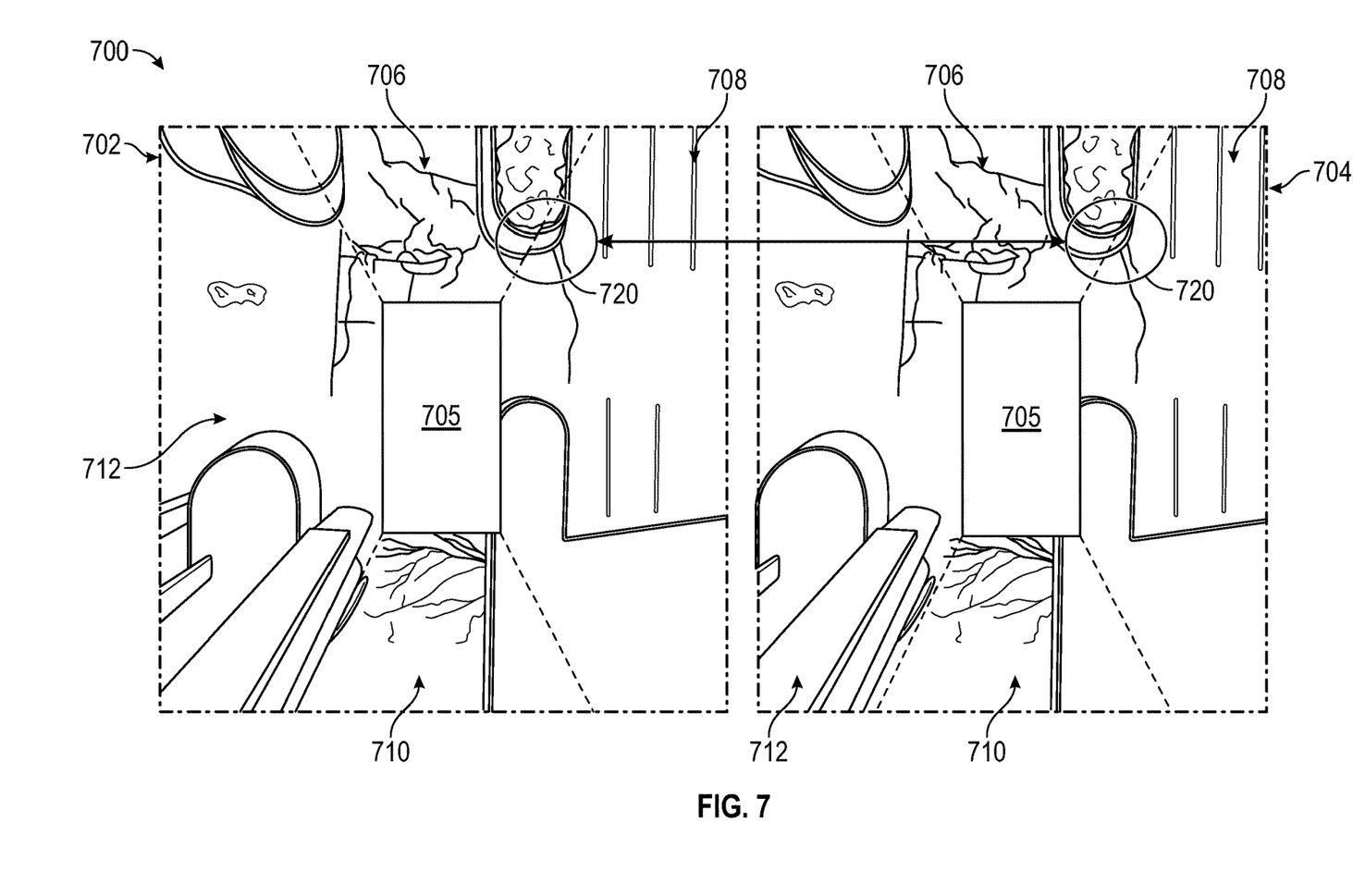
FIG. 7 shows a collection of bird's eye view images associated with multiple cameras of the vehicle.

FIG. 7 shows a collection of bird's eye view images 700 associated with multiple cameras of the vehicle, illustrating a multi-camera optimization method for aligning cameras. The collection of bird's eye view images 700 includes a first set 702 of four bird's eye view (BEV) images in which the images are unaligned. A second set 704 of four BEV images shows the four BEV images of the first set 702 in an aligned state (i.e., after a determined transformation matrix has been applied). The first set 702 and second set 704 both include a front BEV image 706, a right side BEV image 708, a rear BEV image 710 and a left side BEV image 712. Adjacent BEV images have overlapping regions. Blank region 705 is a blind spot representing the location of the vehicle 100.

The optimization algorithm (box 618, FIG. 6) is used to determine the transformation matrix. In the optimization algorithm, a cost function is generated using the values of pixel intensities of pixels in overlapping regions of the images (e.g., overlapped regions of the front BEV image 708 and the right side BEV image 710, overlapped regions of the first BEV image 710 and the second BEV image 712, etc.). The optimization algorithm adjusts transformation parameters (i.e., pitch, roll, yaw) between adjacent BEV images to locate those transformation parameters for which the cost function reaches a minimum, as shown in Eq. (3):

$$\hat{T} = \underset{T}{\arg\min} \sum_{i=1}^{N} \sum_{j=1}^{M} \sum_{k=1}^{P} \text{abs}\left(I^1_{i,j,k,f_{T(C_1)}} - I^2_{i,j,k,f_{T(C_2)}}\right) \quad \text{Eq. (3)}$$

where T is a camera to vehicle transformation, I is the pixel intensity, i is the index of images, j is the index of common area, k is the index of pixels in the common area, C is the camera, and f is a mapping from the original image to the bird's eye view image.

As an example, feature 720 is shown in both the first set 702 and the second set 704. The feature 706 occurs in an overlap region between the front BEV image 706 (for the front camera) and a second BEV image 708 (for the right-side camera). In the first set 702, a discontinuity appears in the feature 720 at an intersection between the front BEV image 706 and the right side BEV image 708. In the second set 704, the discontinuity has disappeared or been reduced.

Figure 8:
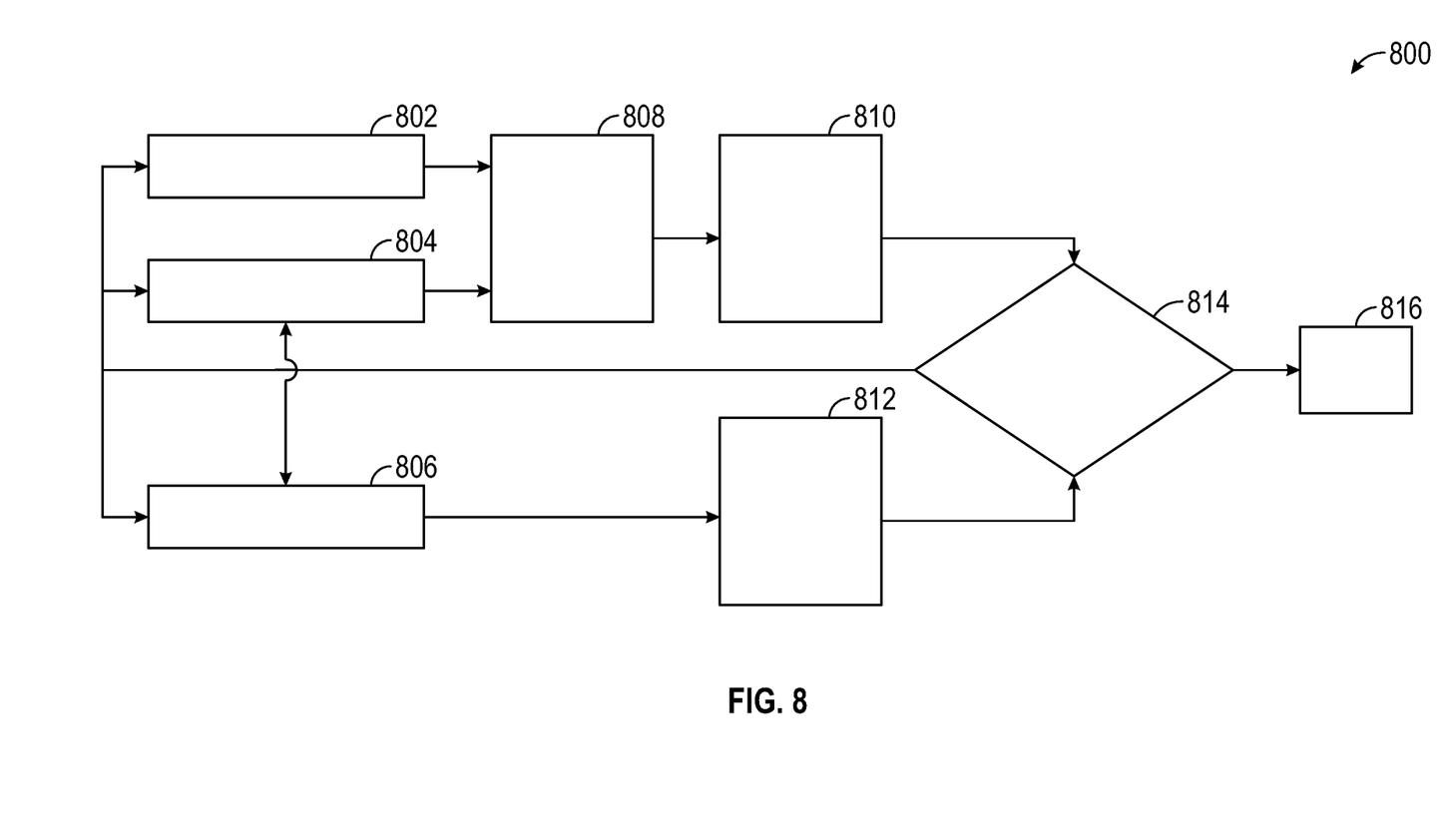
FIG. 8 shows a flowchart of a method for checking a robustness of transformation matrix parameters.

FIG. 8 shows a flowchart 800 of a method for checking a robustness of a transformation matrix parameters. For illustrative purposes, a vehicle-to front camera transformation is represented by transformation matrix $_F^V T$ and a vehicle-to-left side camera transformation is represented by transformation matrix $_L^V T$. These two matrices can be combined to construct a vehicle camera-to-camera transformation between the front camera and the left side camera, as shown in Eq. (4):

$$_L^F T = _F^V T^{-1} {_L^V T} \quad \text{Eq. (4)}$$

where $_L^F T$ is the constructed transformation matrix between the front camera and the left side camera. Each transformation matrix can be written as a collection of a rotation matrix R and a translation matrix t, where:

$$T = \begin{bmatrix} R & t \\ 0 & 1 \end{bmatrix} \quad \text{Eq. (5)}$$

The rotation matrix R can be written in terms of pitch, roll and yaw angles as shown in Eq. (6):

$$R = \begin{bmatrix} \cos\theta*\cos\psi & \cos\theta*\sin\psi & -\sin\theta \\ \sin\varphi\sin\theta\cos\psi - \cos\varphi\sin\psi & \sin\varphi\sin\theta\sin\psi + \cos\varphi\cos\psi & \sin\varphi\sin\theta \\ \cos\varphi\sin\theta\cos\psi + \sin\varphi\sin\psi & \cos\varphi\sin\theta\sin\psi - \sin\varphi\cos\psi & \cos\varphi\cos\theta \end{bmatrix}. \quad \text{Eq. (6)}$$

where θ is a pitch angle, φ is a roll angle and ψ is a yaw angle.

In box 802, a first camera to ground transformation matrix ($_F^V T$) is obtained for a first camera. In box 804, a second camera to ground transformation matrix ($_L^V T$) is obtained for a second camera. In box 806, a constructed camera-to-camera transformation matrix $_L^F T$ is obtained between the first camera and the second camera.

In box 808, the first camera to ground transformation matrix ($_F^V T$) and the second camera to ground transformation matrix ($_L^V T$) are used to determine a constructed camera to camera transformation matrix ($_L^F T'$) (using Eq. (6)). In box 810, the Euler angles (pitch', roll', yaw') and the translation vector t' are obtained from the constructed camera-to-camera transformation matrix ($_L^F T'$). In box 812, Euler angles (pitch, roll, yaw) and the translation vector t are obtained from the camera-to-camera transformation matrix $_F^L T$ obtained in box 806.

In box 814, the two sets of Euler angles are compared to each other. If the difference between the Euler angles is greater than a selected threshold, the method returns to boxes 802, 804 and 806 to obtain new matrices. Otherwise, in box 814, if the difference between the Euler angles is less than the selected threshold the method proceeds to box 816. In box 816, the results (i.e., the Euler angles or one of the Euler angles) are published.

Figure 9:
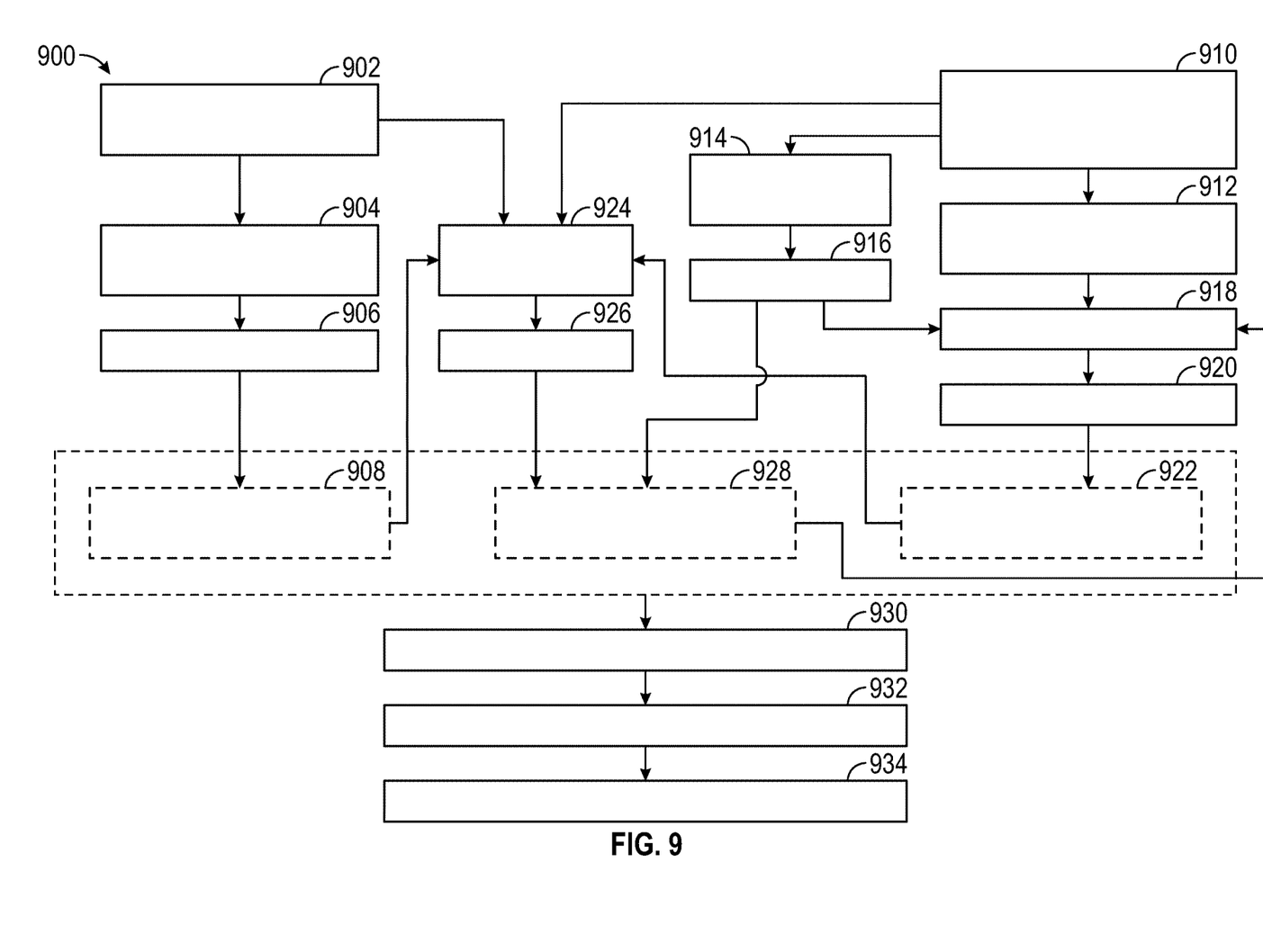
FIG. 9 shows a flowchart for camera-to-vehicle alignment using the methods disclosed herein.

FIG. 9 shows a flowchart 900 for camera-to-vehicle alignment using the methods disclosed herein. In box 902 a set of first images is obtained using a first camera, such as one or both of a front camera or a rear camera. The first images are obtained over a selected time period. In box 904, a plurality of camera-to-ground alignment matrices are determined for the first camera using the set of first images. In box 906, a maturation process is applied to the set of camera-to-ground matrices. In an illustrative maturation process, a matured camera-to-ground matrix is created using a moving average of the set of matrices. Thus, the process of obtaining images and determining camera-to-ground matrices is a continuous process. Other maturation methods can be used in alternative embodiments. In box 908, the matured camera-to-ground matrix is used to produce a stable camera-to-vehicle alignment matrix for the first camera.

Meanwhile, in box 910, a set of second images is obtained using a second camera, such as one or both of a left side camera and a right-side camera. The second set of images is obtained over the selected time period. In box 912, a plurality of camera-to-ground alignment matrices are determined from the second camera using the set of second images.

In box 914, camera-to-camera transformation matrices are calculated using the set of first images and the set of second images. Each camera-to-camera transformation matrix is calculated using a first image and a second image that are synchronized or taken simultaneously or near simultaneously. In box 916, a maturation process is applied to the plurality of camera-to-camera transformation matrices to create a maturated camera-to-camera transformation matrix. In box 918, an adjustment matrix is determined for the second camera, using both the results of box 912 (the camera to ground matrix for the second camera) and the results of box 916 (the maturated camera-to-camera transformation matrix). In box 920, a maturation process is applied to the adjustment matrices of box 918. In box 922, the maturated adjustment matrix is used to produce a stable camera-to-vehicle alignment matrix for the second camera.

Meanwhile, in box 924, the multi-camera optimization process is performed on at least the first images from the first camera(s) and the second images from the second camera(s). In box 926, the results of the multi-camera optimization can be maturated to produce a maturated transformation matrix between the first camera and the second camera. In box 928, the maturated transformation matrix can be used to generate stable camera-to-camera alignment matrices (i.e., generated based on the bird's eye view images).

The maturated camera-to-camera values obtained in box 916 can be used during the calculation of the stable camera-to camera values obtained in box 928. Also, the stable camera-to-vehicle alignment matrices for the front and rear cameras and the stable camera-to-vehicle alignment matrices for the left side and ride side camera that are obtained in boxes 908 and 922, respectively, can be used in subsequent multi-camera optimization processes in box 924. Also, the stable camera-to-camera alignment matrices that are obtained in box 928 can be used in subsequent calculations of the side camera adjust matrix (in box 918).

In box 930, a maturation process can be used on the results of boxes 908, 922 and 928. In box 932, the results of the maturation process are published to the vehicle, which can be used in box 934 to control subsequent perception and motion planning operations of the vehicle.

Figure 10:
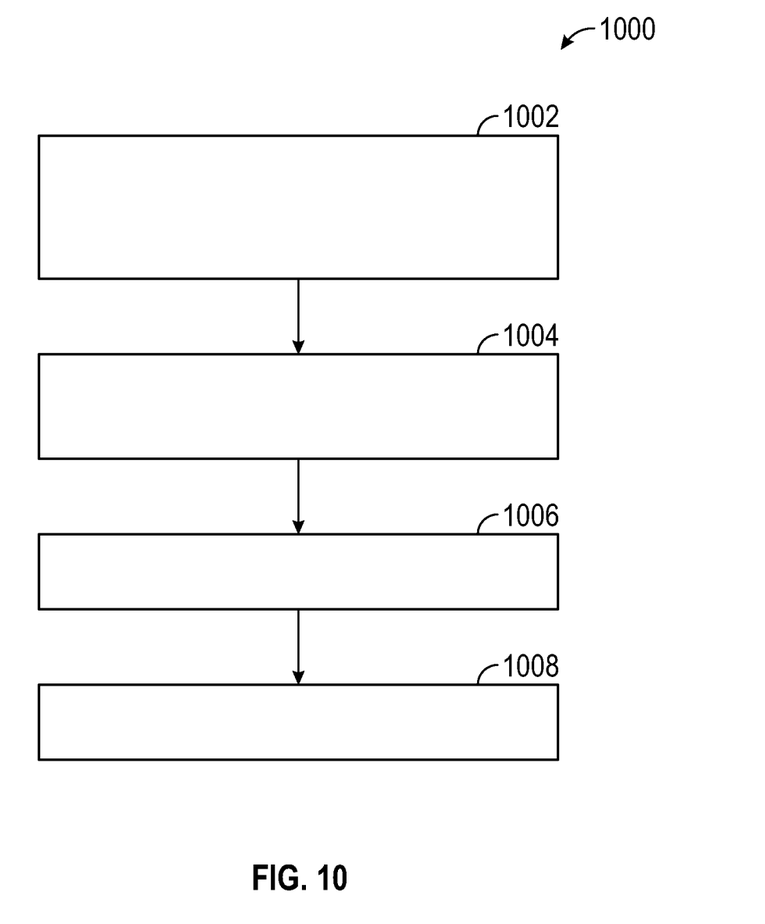
FIG. 10 shows a flowchart of a method for camera alignment, in an illustrative embodiment.

FIG. 10 shows a flowchart 1000 of a method for camera alignment, in an illustrative embodiment. In box 1002, a camera to ground alignment process (FIG. 2) is used to extract a motion vector and a ground normal vector from an image obtained at the first camera to form an alignment matrix for the first camera. The alignment matrix is maturated the maturated alignment matrix is used generate an initial camera-to-vehicle transformation matrix for the first camera. In box 1004, a camera-to-camera algorithm (FIG. 3) is used to extract camera-to-camera transformation matrix between the first camera and the second camera. In box 1006, the camera-to-camera transformation matrix is used to correct an alignment of the second camera. In box 1008, the multi-camera optimization is performed to generate final camera-to-vehicle transformation matrices.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of aligning a first camera of a vehicle and a second camera of the vehicle to a reference frame of the vehicle, comprising:
    obtaining a first camera-to-ground transformation matrix for the first camera using a first image obtained using the first camera, wherein the first camera-to-ground transformation matrix relates a first coordinate system of the first camera to a ground coordinate system;
    extracting a first ground normal vector from the first image;
    obtaining a second camera-to-ground transformation matrix for the second camera using a second image obtained using the second camera, wherein the second camera-to-ground transformation matrix relates a second coordinate system of the second camera to a ground coordinate system;
    extracting a second ground normal vector from the second image;
    obtaining a camera-to-camera transformation matrix between the first coordinate system of the first camera and the second coordinate system for the second camera by determining a roll angle that aligns the first ground normal vector with the second ground normal vector;
    obtaining a motion vector from the second image;
    rotating the motion vector within the second coordinate system using the roll angle to generate a rotated motion vector;
    determining a pitch angle and a yaw angle from the rotated motion vector; and
    calculating a modified camera-to-ground transformation matrix for the second camera using the roll angle, the pitch angle and the yaw angle.

2. The method of claim 1, further comprising rotating the first image to obtain a first bird's eye view image, rotating the second image to obtain a second bird's eye view image, and aligning the first bird's eye view image to the second bird's eye view image.

3. The method of claim 2, wherein aligning the first bird's eye view image to the second bird's eye view image further comprises running an optimization program on overlapping regions of the first bird's eye view image and the second bird's eye view image.

4. The method of claim 3, further comprises running the optimization program to determine a transformation matrix between the first bird's eye view image and the second bird's eye view image that minimizes a difference between a first intensity of a first pixel in the first bird's eye view image and a second intensity of a second pixel in the second bird's eye view image.

5. The method of claim 1, further comprising maturating the first camera-to-ground transformation matrix to generate a camera-to-vehicle transformation matrix for the first camera.

6. The method of claim 1, wherein the first camera is a front camera of the vehicle and the second camera is one of: (i) a left side camera; and (ii) a right side camera.

7. The method of claim 1, further comprising synchronizing the first image with the second image.

8. A system for aligning a first camera of a vehicle and a second camera of the vehicle to a reference frame of the vehicle, comprising:
 a processor configured to:
 obtain a first camera-to-ground transformation matrix for the first camera using a first image obtained using the first camera, wherein the first camera-to-ground transformation matrix relates a first coordinate system of the first camera to a ground coordinate system;
 extract a first ground normal vector from the first image;
 obtain a second camera-to-ground transformation matrix for the second camera using a second image obtained using the second camera, wherein the second camera-to-ground transformation matrix relates a second coordinate system of the second camera to a ground coordinate system;
 extract a second ground normal vector from the second image;
 obtain a camera-to-camera transformation matrix between the first coordinate system of the first camera and the second coordinate system of the second camera by determining a roll angle that aligns the first ground normal vector with the second ground normal vector;
 obtain a motion vector from the second image;
 rotate the motion vector within the second coordinate system using the roll angle to generate a rotated motion vector;
 determine a pitch angle and a yaw angle from the rotated motion vector; and
 calculate a modified camera-to-ground transformation matrix for the second camera using the roll angle, the pitch angle and the yaw angle.

9. The system of claim 8, wherein the processor is further configured to rotate the first image to obtain a first bird's eye view image, rotate the second image to obtain a second bird's eye view image, and align the first bird's eye view image to the second bird's eye view image.

10. The system of claim 9, wherein the processor is further configured to run an optimization program on overlapping regions of the first bird's eye view image and the second bird's eye view image to align the first bird's eye view image to the second bird's eye view image.

11. The system of claim 10, wherein the processor is further configured to run the optimization program to determine a transformation matrix between the first bird's eye view image and the second bird's eye view image that minimizes a difference between a first intensity of a first pixel in the first bird's eye view image and a second intensity of a second pixel in the second bird's eye view image.

12. The system of claim 8, wherein the processor is further configured to maturate the first camera-to-ground transformation matrix to generate a camera-to-vehicle transformation matrix for the first camera.

13. The system of claim 8, wherein the first camera is a front camera of the vehicle and the second camera is one of: (i) a left side camera; and (ii) a right side camera.

14. The system of claim 8, wherein the processor is further configured to synchronize the first image with the second image.

15. A vehicle, comprising:
 a first camera for obtaining a first image, the first camera having a first coordinate system;
 a second camera having a second coordinate system;
 a processor configured to:
 obtain a first camera-to-ground transformation matrix for the first camera using the first image, wherein the first camera-to-ground transformation matrix relates the first coordinate system to a ground coordinate system;
 extract a first ground normal vector from the first image;
 obtain a second camera-to-ground transformation matrix for the second camera using a second image obtained using the second camera, wherein the second camera-to-ground transformation matrix relates a second coordinate system of the second camera to a ground coordinate system;
 extract a second ground normal vector from the second image;
 obtain a camera-to-camera transformation matrix between the first coordinate system of the first camera and the second coordinate system of the second camera by determining a roll angle that aligns the first ground normal vector with the second ground normal vector;
 obtain a motion vector from the second image;
 rotate the motion vector within the second coordinate system using the roll angle to generate a rotated motion vector;
 determine a pitch angle and a yaw angle from the rotated motion vector; and
 calculate a modified camera-to-ground transformation matrix for the second camera using the roll angle, the pitch angle and the yaw angle.

16. The vehicle of claim 15, wherein the processor is further configured to rotate the first image to obtain a first bird's eye view image, rotate the second image to obtain a second bird's eye view image, and align the first bird's eye view image to the second bird's eye view image.

17. The vehicle of claim 16, wherein the processor is further configured to run an optimization program on overlapping regions of the first bird's eye view image and the second bird's eye view image to align the first bird's eye view image to the second bird's eye view image.

18. The vehicle of claim 17, wherein the processor is further configured to run the optimization program to determine a transformation matrix between the first bird's eye view image and the second bird's eye view image that minimizes a difference between a first intensity of a first pixel in the first bird's eye view image and a second intensity of a second pixel in the second bird's eye view image.

19. The vehicle of claim 15, wherein the first camera is a front camera of the vehicle and the second camera is one of: (i) a left side camera; and (ii) a right side camera.

20. The vehicle of claim 15, wherein the processor is further configured to synchronize the first image with the second image.

* * * * *